March 12, 1940.    L. E. DIMOND    2,192,898
APPARATUS FOR DRYING ANIMAL CASINGS
Filed Jan. 5, 1939    2 Sheets-Sheet 1
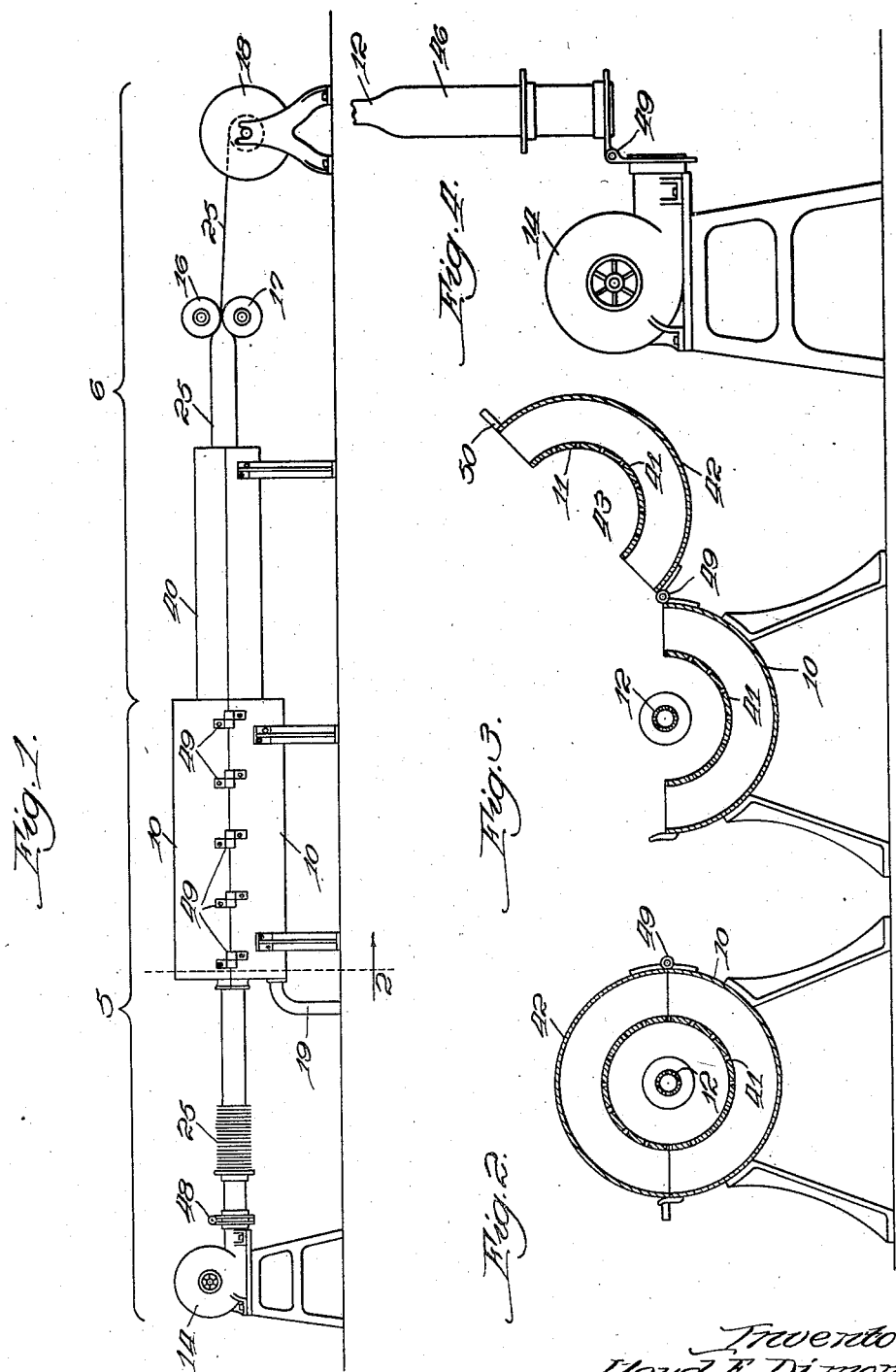

March 12, 1940. L. E. DIMOND 2,192,898
APPARATUS FOR DRYING ANIMAL CASINGS
Filed Jan. 5, 1939 2 Sheets-Sheet 2

Inventor:
Lloyd E. Dimond.
By Chritton, Wiles, Davies, Hirsch & Dawson.
Attys.

Patented Mar. 12, 1940

2,192,898

UNITED STATES PATENT OFFICE 2,192,898

APPARATUS FOR DRYING ANIMAL CASINGS

Lloyd E. Dimond, Chicago, Ill., assignor to Wilson & Co., a corporation of Delaware Application January 5, 1939, Serial No. 249,522

6 Claims. (Cl. 34—26)

This invention relates to an apparatus for drying animal casings. The apparatus is designed to be used for preparing the casings described in the copending application of Nicholas M. Adams, Ser. No. 243,467, filed December 1, 1938.

Animal intestines, commonly called casings, have heretofore been prepared by cleaning them and then packing them in a large amount of salt, and keeping them under refrigeration. Salted casings so prepared generally will not spoil, but the bacterial count thereon is very high, generally running about three million per gram. Moreover, salt burns take place in the casings, in some instances causing holes or weakened spots in the casing, depending upon the severity of the salt burn. The greatest disadvantage with salted casings is the large amount of salt required and the resultant great expense of transportation. An ordinary tierce will weigh about 600 pounds, of which only about 60 pounds will be represented by the casings themselves upon a dry basis, the rest being salt and moisture.

In the prior art practice, and particularly sheep, hog and goat casings, the casings are pulled from the animal, stripped in water, cleaned on special machines immediately; the casings are then taken and graded as to size and quality, after which they are salted, drained, and then packed with salt, either with or without previous curing in a pickle solution. The salted casings are then placed in wooden tierces, as already described.

In accordance with the present invention, the necessity of salting and refrigeration is entirely done away with. In place of the salt, the casings are air-dried to a predetermined moisture content, and are then packed, preferably in the absence of air.

A very simple and quickly applied natural test for a suitable moisture content has been discovered, namely, that when the casings are dry enough so that their folds do not stick together upon contact, they are dry enough to keep.

Figure 5:
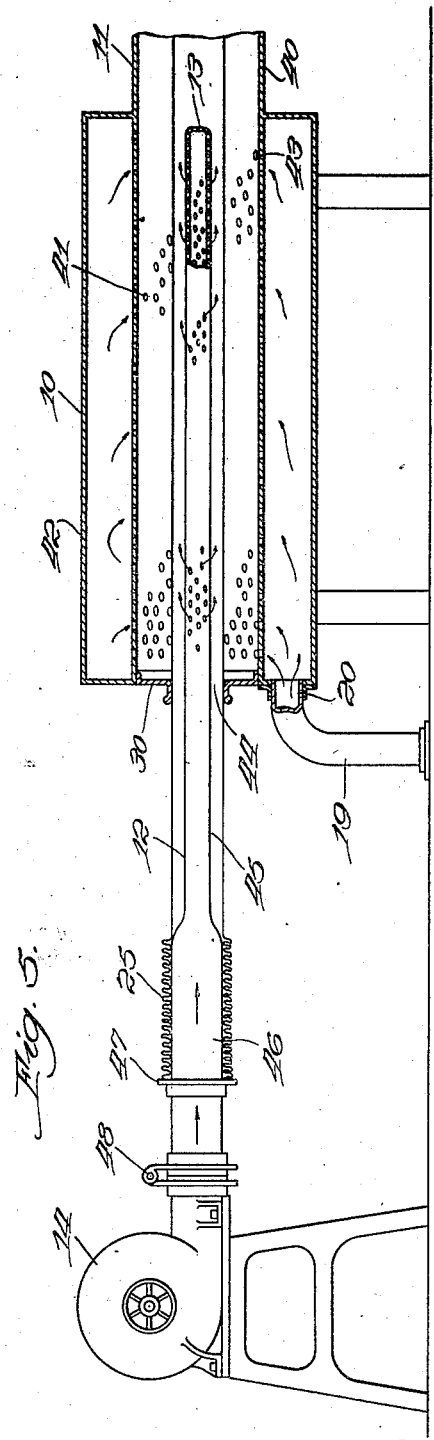
Figure 6:
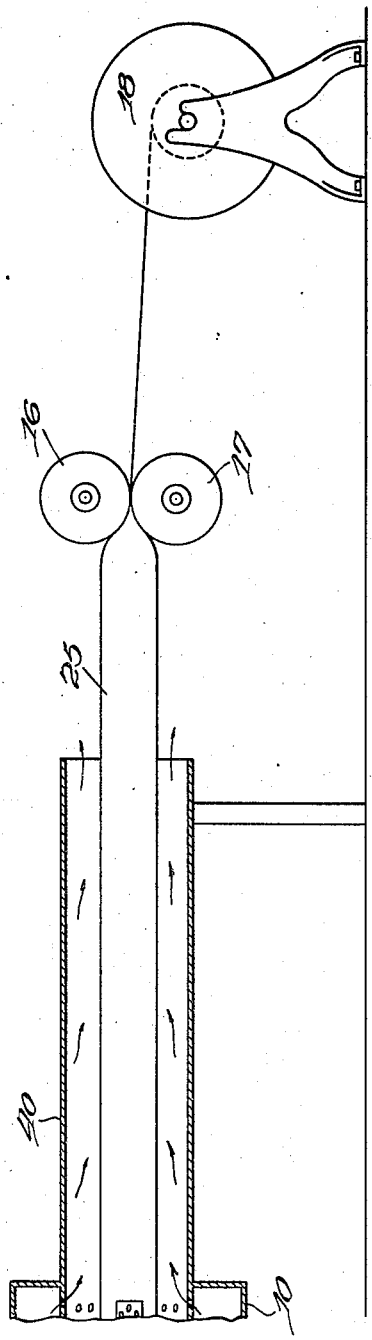

The apparatus is shown in the drawings in which Fig. 1 illustrates a side elevation, partly in section and partially broken away, of the drying device with a casing being treated in it; Fig. 2 is an end view of the drying chamber in closed position; Fig. 3 is a similar view with the chamber open; Fig. 4 is a side elevation partly broken away showing the mandrel in raised position; Fig. 5 is a view on a large scale of the left-hand portion of the device as shown in Fig. 1, with the chamber in section; and Fig. 6 is a similar view of the remainder of the device as shown in Fig. 1.

The apparatus comprises a drying chamber 10 provided with a central tube 11 which extends beyond the chamber proper to form a chimney portion 40. That portion of the tube 11 which is within the chamber is perforated with a large number of small holes 41 and acts as a baffle to distribute warm air which is supplied through the line 19 and enters the chamber at 20. The outer wall 42 of the chamber 10 and the central tube 11 thus form an annular header or manifold surrounding a central opening 42 within the heating chamber.

The heating chamber arrangement shown provides a gentle evenly distributed heating action. While the device does not employ the usual countercurrent flow of gases, it introduces somewhat warmer and dryer gas at the beginning, and greater volumes of the cooler, wetter gas at the end of the chamber.

At the rear end of the chamber the central opening is partially closed by an annular rubber plate 30, the plate being provided, however, with a central opening 44 just large enough to accommodate an inflated casing. A mandrel 12 is likewise provided and consists of a long, hollow, tubular portion 45 and a relatively short expanded base portion 46. The diameter of the base portion is substantially that of the opening 44 in the plate 30. A stop 47 is provided on the base portion and rearwardly thereof the mandrel is pivotally connected at 48 to an air blower 14.

The heating chamber 10 is hinged at 49 and may be lifted by the handle 50 into the position shown in Fig. 3. When the heating chamber is in open position the mandrel may be lifted into the position shown in Fig. 4 and when in this position a casing may be gathered upon the thickened portion 46 thereof. The mandrel may then be returned to its normal position and the heating chamber closed.

Beginning at the free end of the mandrel and continuing back throughout that portion of the mandrel within the heating chamber are a large number of small perforations 13 through which air is supplied from the mandrel to the inside of the casing.

Associated with the outlet 11 are a pair of rollers 16 and 17 mounted in any suitable fashion and driven in any suitable manner which serve both to deflate the casing passing through them and to motivate the casing through that part of the apparatus preceding these rollers (viz., taking the casing off the mandrel and passing it through the drying chamber).

In the drawings a casing 25 is shown extending through the apparatus, being still partially gathered upon the large portion of mandrel, inflated through the heating chamber and the chimney 40 and deflated after passing through the roller 16 and 17. The dried casing is wound upon a reel 18 which may be driven in any suitable manner.

In starting the casing through the apparatus, the free end of the casing is closed with a string which is extended through the apparatus and placed between the motivating rollers 16 and 17. When the casing has projected through the rollers 16 and 17 to the point where it can be readily attached to the reel 18, the string is detached and the casing is attached to the reel 18. Reel 18 is actuated so that as the drying operation progresses, the casing is wound tightly on the reel, but the driving mechanism is frictionally disengaged, in known manner, so that as the diameter of the core increases the wheel is driven only the required amount. Reel 18 and rollers 16 and 17 are propelled by independent means at suitable rates of speed.

Only very little air passes through the blower fan 14, the purpose of this being to free the casing from the mandrel and to keep it inflated. Hog and sheep casings, which are the ones primarily treated upon this apparatus, are so porous that they will not remain inflated for a very long period without the addition of a fresh supply of air.

The amount of air supplied to the line 19 is preferably about 15 cubic feet per minute of air at 140° F. and 15 to 25% relative humidity. When the air is supplied at this rate, the casings are advanced at the rate of about 2½ feet per minute. The temperature of the casing, however, never quite reaches the temperature of the air.

The extension 40 of the tube 11 provides a chimney-effect wherein the air which, by that time, has absorbed a good deal of moisture and is relatively saturated, acts to bring the outer and inner portions of the casing into closer equilibrium as to moisture content, and provides a better finished casing.

The drying temperature, however, is not critical. It can be varied between 70 and 160° F., and the relative humidity may vary from, say, 5 to 40%. Likewise, the air velocity may vary from 5 to 30 cubic feet per minute, or within wider ranges if other conditions are controlled.

For hog, sheep and goat gut, a mandrel about a foot long and having ⅜ inch external diameter is suitable. The jacket 11 is about 1½ inches in diameter, and is 8 or 9 inches long with the chamber, and extends about 8 inches beyond it. The chamber itself is approximately 3 inches by 8.

After the entire casing has been run onto the reel, the casing is packed in the absence of air without salt. Preferably this is done in a substantial vacuum, say 22–29 inches of mercury. However, inert gases such as nitrogen may be used in the place of vacuum.

If the dried casings are left in air for a prolonged period, the protein material gradually loses its ability to soak or "plump" freely in water without the addition of alkali or acids. The vacuum packed or inert gas packed material does not act in this manner. Even after many months it may be handled like fresh material.

It is thus possible to eliminate the large amounts of salt heretofore required, and also to save nine-tenths of the freight and a great deal of expense for salt, tierces, and the costs of refrigeration. At the same time, the casings themselves are actually better than before and are more sanitary from a bacteriological standpoint, the bacterial count on a casing prepared according to this invention being only about 1/350 of that of a salted casing.

The casings may be subdivided longitudinally or transversely and employed in sausage making, surgical sutures, tennis or other strings, or any other casing use.

I claim:

1. Apparatus for drying porous animal casings comprising a hollow mandrel, means for supplying air to the hollow mandrel, one end of the mandrel being adapted for gathering a casing thereon and the other end portion being provided with a plurality of small perforations, a heating chamber about the perforated end of the mandrel, means for supplying warm, dry air to the heating chamber, and means for progressively drawing a casing from the mandrel and through the chamber.

2. Apparatus as set forth in claim 1 in which the chamber is provided with an elongated chimney on that side from which the casing is drawn.

3. Apparatus for drying animal casings comprising a mandrel provided with an enlarged portion and a relatively smaller diameter portion provided with a plurality of perforations, said mandrel being hollow throughout the perforated area, means for supplying air to the interior of the mandrel, a heating chamber substantially surrounding the perforated portion of the mandrel, and means for drawing a casing through the heating chamber.

4. Apparatus as set forth in claim 3 in which the heating chamber is longitudinally divided and is pivotally mounted on such line of division.

5. Apparatus as set forth in claim 3 in which the heating chamber is divided on its horizontal axis and in which the mandrel is pivotally mounted to be swingable from the chamber upon opening thereof.

6. Apparatus for drying porous animal casings comprising a mandrel adapted for the gathering of a wet casing thereon, means for continuously supplying air to the interior of the casing, means for withdrawing the casing from the mandrel, means for surrounding a portion of the exterior of the withdrawn casing with a current of warm dry air traveling in the direction of the movement of the casing, means for adding warm dry air to the current to increase the volume thereof, and means for passing the enlarged volume of air, cooled and moistened by contact with the casing, without further additions of warm dry air, around the casing and in the direction of its movement.

LLOYD E. DIMOND.